US011388125B1

(12) United States Patent
Paul

(10) Patent No.: US 11,388,125 B1
(45) Date of Patent: Jul. 12, 2022

(54) SYSTEMS AND METHODS FOR UNIDIRECTIONAL VIDEO STREAMING

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/237,956

(22) Filed: Apr. 22, 2021

(51) Int. Cl.
| H04L 51/046 | (2022.01) |
| H04L 65/60 | (2022.01) |
| G06Q 50/00 | (2012.01) |
| H04L 51/00 | (2022.01) |
| H04N 7/15 | (2006.01) |

(52) U.S. Cl.
CPC .......... *H04L 51/046* (2013.01); *G06Q 50/01* (2013.01); *H04L 51/16* (2013.01); *H04L 65/601* (2013.01); *H04L 65/607* (2013.01); *H04N 7/15* (2013.01)

(58) Field of Classification Search
CPC ......... H04L 51/046; H04L 51/16; H04L 7/15; H04L 65/601; H04L 65/607
See application file for complete search history.

(56) References Cited

U.S. PATENT DOCUMENTS

| 5,864,874 A | 1/1999 | Shapiro |
| 9,077,850 B1 | 7/2015 | Groves et al. |
| 2006/0146854 A1 | 7/2006 | Park |
| 2011/0164163 A1* | 7/2011 | Bilbrey .............. H04N 5/23206 348/E5.022 |
| 2016/0044279 A1* | 2/2016 | Block ................. H04L 65/1069 348/14.09 |
| 2016/0048989 A1* | 2/2016 | Gabbidon ........... G06F 3/04842 715/716 |
| 2017/0324624 A1* | 11/2017 | Taine ..................... H04L 67/22 |

OTHER PUBLICATIONS

Paul, Debashish, "Systems and Methods for Co-Present Digital Messaging", U.S. Appl. No. 17/237,952, filed Apr. 22, 2021, 66 pages.
Paul, Debashish, "Systems and Methods for Availability-Based Streaming", U.S. Appl. No. 17/237,954, filed Apr. 22, 2021, 70 pages.
Paul, Debashish, "Display Screen With a Graphical User Interface", U.S. Appl. No. 29/780,150, filed Apr. 22, 2021, 19 pages.

(Continued)

*Primary Examiner* — Andrea C Leggett
(74) *Attorney, Agent, or Firm* — FisherBroyles, LLP

(57) ABSTRACT

Systems and methods for unidirectional video streaming may include (1) detecting that a user of a messaging service has digitally selected a video-streaming initiation element presented within a messaging thread interface that enables digital messaging between the user and a contact of the user and, in response to detecting that the user has digitally selected the video-streaming initiation element, (2) triggering the streaming of a unidirectional live video stream originating from a device of the user only, without triggering the streaming of any live video stream originating from a device of the contact. Various other methods, systems, and computer-readable media are also disclosed.

20 Claims, 10 Drawing Sheets

(56) References Cited

OTHER PUBLICATIONS

Paul, Debashish, "Display Screen With a Graphical User Interface", U.S. Appl. No. 29/780,144, filed Apr. 22, 2021, 31 pages.
Paul, Debashish, "Display Screen With a Graphical User Interface", U.S. Appl. No. 29/780,146, filed Apr. 22, 2021, 20 pages.
Paul, Debashish, "Display Screen With an Animated Graphical User Interface", U.S. Appl. No. 29/780,147, filed Apr. 22, 2021, 20 pages.
Paul, Debashish, "Display Screen With a Graphical User Interface", U.S. Appl. No. 29/780,148, filed Apr. 22, 2021, 19 pages.
Writtenhouse S., "How to Use Inline Replies in Messages on iPhone and iPad," idownloadblog.com, Sep. 16, 2020, 6 pages, Retrieved from the Internet: URL: https://www.idownloadblog.com/2020/07/23/inline-replies-messages-iphone-ipad/.

* cited by examiner

100

Detecting that a user of a messaging service has digitally selected a video-streaming initiation element presented within a messaging thread interface that enables digital messaging between the user and a contact of the user

110

In response to the detecting, triggering the streaming of a unidirectional live video stream originating from a device of the user only, without triggering the streaming of any live video stream originating from a device of the contact

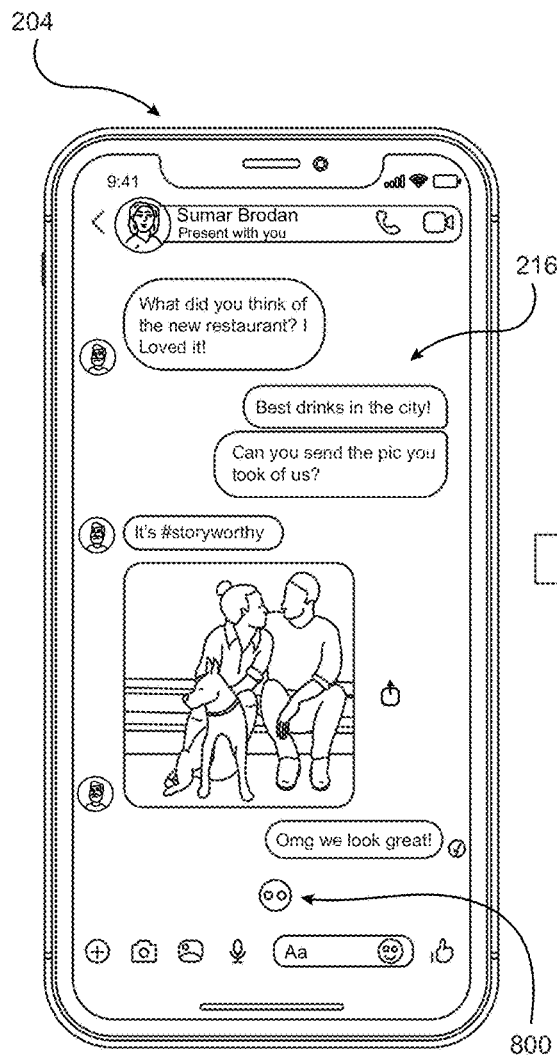
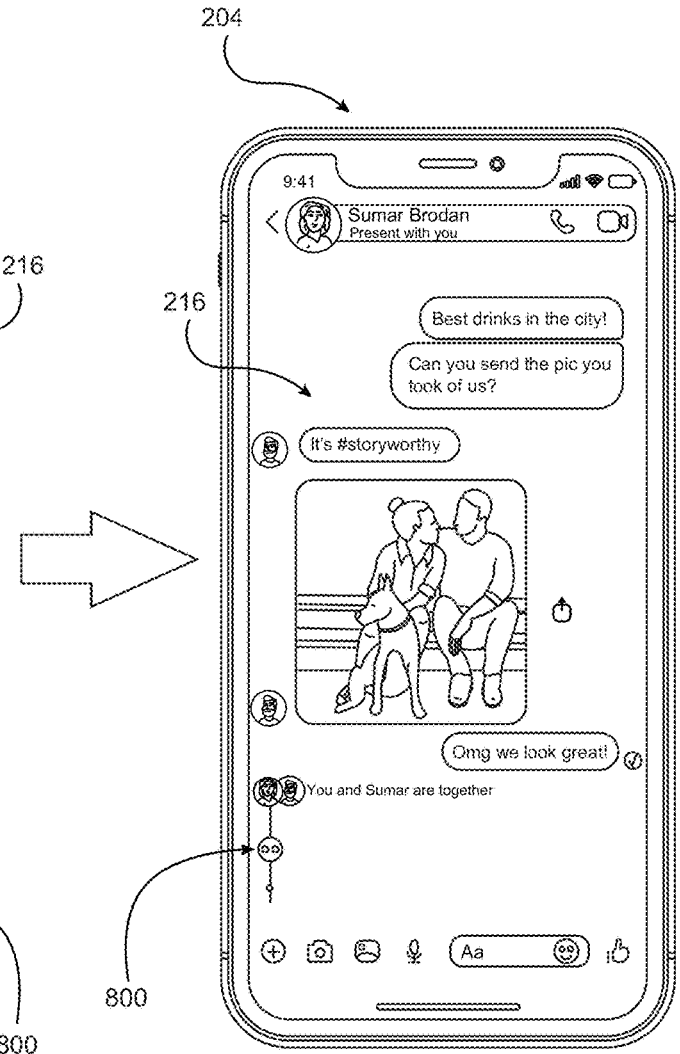
Fig 8A                    Fig 8B

SYSTEMS AND METHODS FOR UNIDIRECTIONAL VIDEO STREAMING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 is a flow diagram of an exemplary method for enabling availability-based streaming.

FIGS. 8A-8B are an illustration of an exemplary truncated calling element in an exemplary messaging thread presented during a non-co-present moment (in FIG. 8A) and during a co-present moment (in FIG. 8B).

Figure 2:
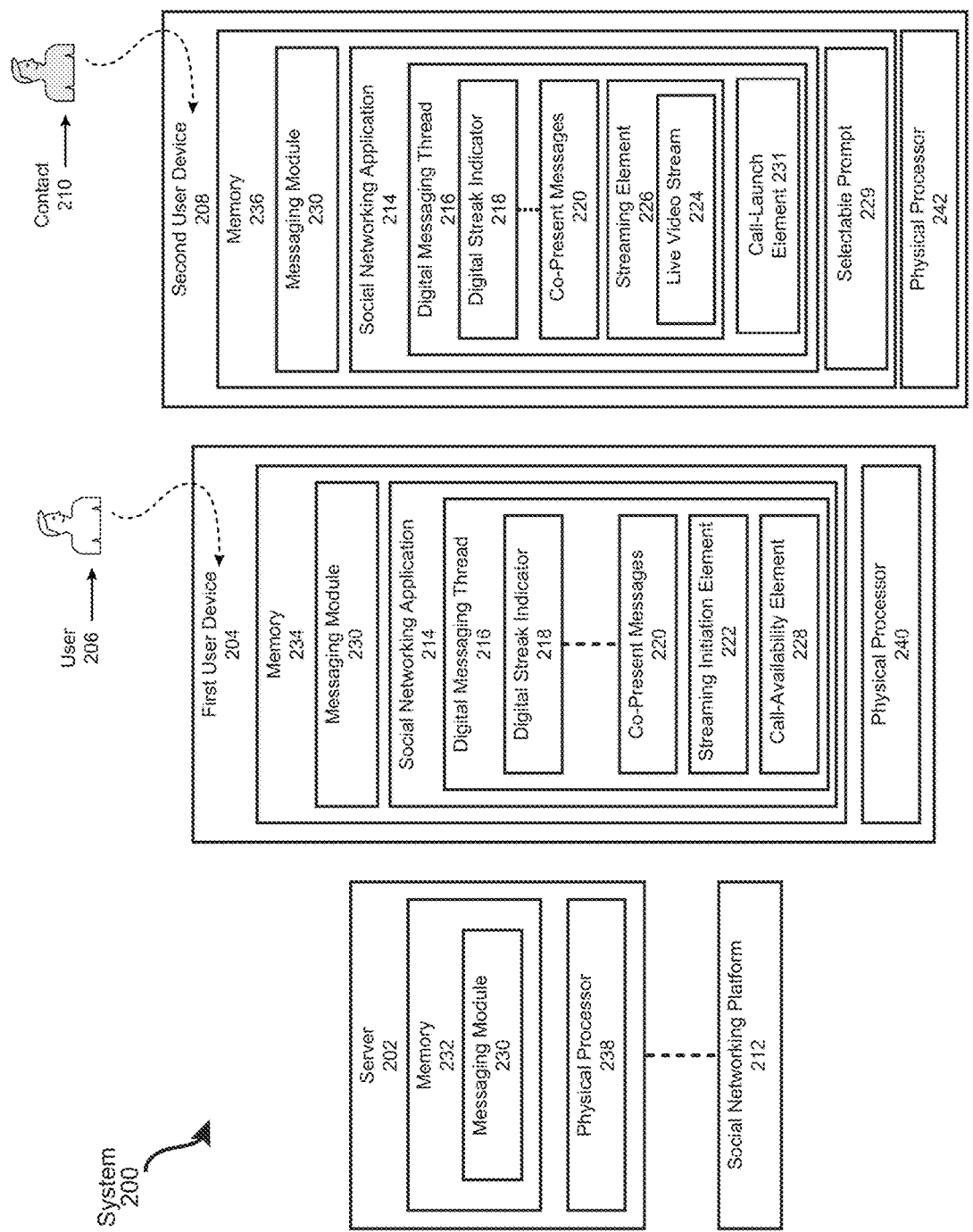
FIG. 2 is a block diagram of an exemplary system for enabling availability-based streaming.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure identifies a need for systems and methods that enable unidirectional video calling, initiated unilaterally, via a digital messaging thread. In some examples, a unidirectional-video-streaming initiation element may appear within the digital messaging thread. When selected via user input to a user device, the selection may trigger live video (e.g., of a user), originating from the user device, to begin streaming within the digital messaging thread via a streaming element (e.g., a circular streaming element). The selection via user input of the unidirectional-video-streaming initiation element may be configured to trigger streaming from only the user device via which the user input was received, without triggering live video (e.g., of any other user) to begin streaming from any other device being used to access the digital messaging thread. While the live video from the user device is streaming, text messages (received via one or more other devices being used to access the digital messaging thread) may continue to be posted to the digital messaging thread. If user input from another device, being used to access the digital messaging thread, selects the streaming element, as the streaming element is streaming the unidirectional live video stream, a bidirectional live video call may be initiated in response.

As will be explained in greater detail below, embodiments of the present disclosure may improve the field of digital messaging by improving a data flow enabling video calling via digital message threads. This may in turn improve the functioning of a computer itself by improving data organization and access to computer functionality. The present disclosure my also improve the field of digital messaging by improving accessibility to video streaming via digital messaging threads.

The following will provide, with reference to FIG. 1, detailed descriptions of computer-implemented methods for enabling unidirectional video calling via digital messaging threads. Detailed descriptions of corresponding example systems will also be provided in connection with FIG. 2. Detailed descriptions of corresponding interfaces and embodiments will be provided in connection with FIGS. 3-11.

FIG. 1 is a flow diagram of an exemplary computer-implemented method 100 for enabling unidirectional video calling via digital messaging threads. The steps shown in FIG. 1 may be performed by any suitable computer-executable code and/or computing system, including the system(s) illustrated in FIG. 2. For example, the steps shown in FIG. 1 may be performed by modules operating in a server 202 (e.g., as shown in exemplary system 200 in FIG. 2) and/or modules operating in (1) a first user device 204 (associated with a user 206) and/or (2) a second user device 208 (associated with a contact 210 of user 206). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at social networking. The term "social networking" may refer to any type or form of digital communication that occurs between users of a platform via an interface of the platform (e.g., text-based communication, video conferencing and/or audio conferencing, public content posting and/or commenting, etc.). In some examples, server 202 may operate as part of and/or in connection with a social networking platform 212. Although illustrated as a single entity in FIG. 2, server 202 may include and/or represent a group of multiple servers that operate in conjunction with one another.

First user device 204 and second user device 208 generally represents any type or form of computing device capable of reading computer-executable instructions. For example, first user device 204 and/or second user device 208 may represent a smart phone and/or a tablet. Additional examples of first user device 204 and/or second user device 208 may include, without limitation, a laptop, a desktop, a wearable device, a personal digital assistant (PDA), etc.

In some examples, users 206 and 210 of user devices 204 and 208 may be users (e.g., members) of social networking platform 212. In these examples, user devices 204 and 208 may each have installed an instance of a social networking application 214, which may operate as part of social networking platform 212 and through which one or more services provided via server 202 may be accessible. In some examples, social networking application 214 may be dedicated to a single service. For example, social networking application 214 may represent a dedicated messaging application dedicated to the digital messaging service described below. In other examples, social networking application 214 may provide access to multiple services (e.g., a combination of the digital newsfeed service, digital story service, digital messaging service, and/or digital conferencing service described below). In addition, or as an alternative, to social networking application 214, user devices 204 and/or 208 may have installed a browser that may navigate to one or more webpages maintained by social networking platform 212, through which the one or more services provided via server 202 and social networking platform 212 may also be accessible.

As mentioned above, social networking platform 212 may provide a variety of services for the users within its network (e.g., via server 202 and/or social networking application 214). For example, social networking platform 212 may provide a newsfeed service. The term "newsfeed" may generally refer to any type or form of social media consumption channel that presents a scrollable collection of newsfeed posts. In some examples, a newsfeed may scroll (e.g., upward or downward) to reveal different posts within the newsfeed (e.g., in response to receiving user scrolling input). In one example, the scrollable collection may include newsfeed posts created by contacts of a particular user (e.g., friends of the particular user). The term "newsfeed post" generally refers to any type or form of digital composition that may be displayed in a newsfeed. Newsfeed posts may include, without limitation, text-based compositions, media-based compositions (which may include either a single media item or a collage of multiple media items), and/or a link to an online article. The newsfeed service may enable viewers of a newsfeed post to comment on the newsfeed post, via a text and/or image-based reply, creating a digital thread of comments. A digital messaging thread 216, and features that the disclosed systems may provide via digital messaging thread 216, will be described in greater detail below. While the instant disclosure focuses on an embodiment in which digital messaging thread 216 is provided by a messaging service of social networking platform 212 (e.g., as part of a private group chat), in some embodiments, digital messaging thread 216 may represent a thread of comments (e.g., responding to a newsfeed post, a digital story, and/or posted as part of a digital audio and/or video conference) provided by a newsfeed service, a digital story service, and/or a digital conferencing service of social networking platform 212.

As another example, social networking platform 212 may provide a digital story service. The digital story service may provide users with a story consumption channel, which presents a continuous series of digital story posts to a story-consumer, one by one. The term "digital story post" may generally refer to any type or form of social media post intended for a story consumption channel. A digital story composition may include a variety of content (e.g., a digital photograph, a graphic, text, a digital video and/or a digital recording of a music composition). In one example, the story consumption channel may transition from presenting one digital story post to the next automatically, without requiring any user input to do so. In some examples, digital story posts from a same source (e.g., created and/or posted by a same user) may be grouped together within the story consumption channel, such that each digital story post from a particular source is displayed prior to displaying digital story posts from another source. In one embodiment, a digital story post may be ephemeral. That is, the digital story post may only be viewable for a predetermined amount of time. For example, a digital story composition may be set to disappear after twenty-four hours. Similar to the newsfeed service, the digital story service may enable viewers of a story post to comment on the post, via a text and/or image-based reply and/or reply story, creating a digital thread of comments.

Figure 3:
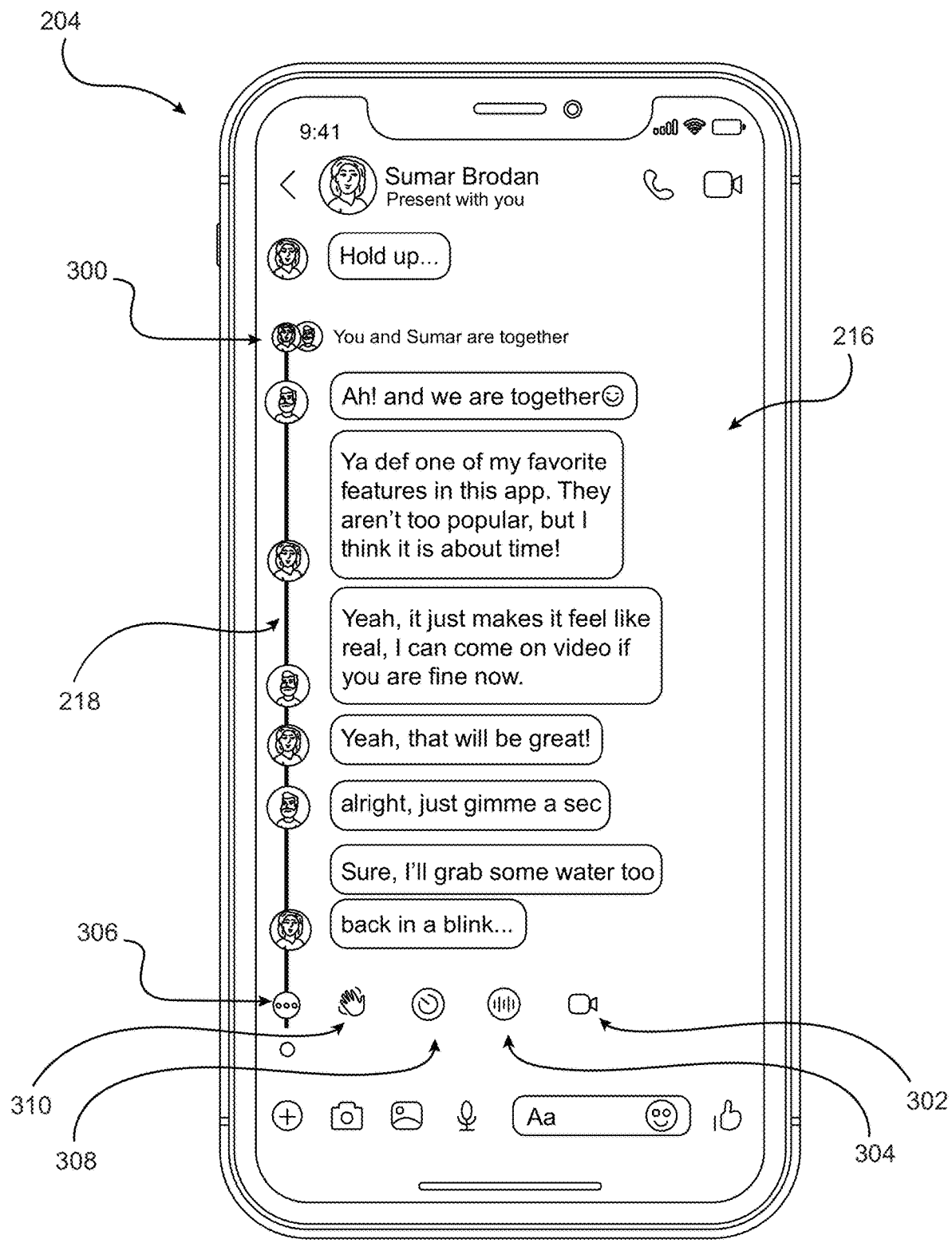
FIG. 3 is an illustration of an exemplary digital messaging thread, presented within a messaging thread interface, with a digital streak indicator indicative of a co-present moment.
Figure 4:
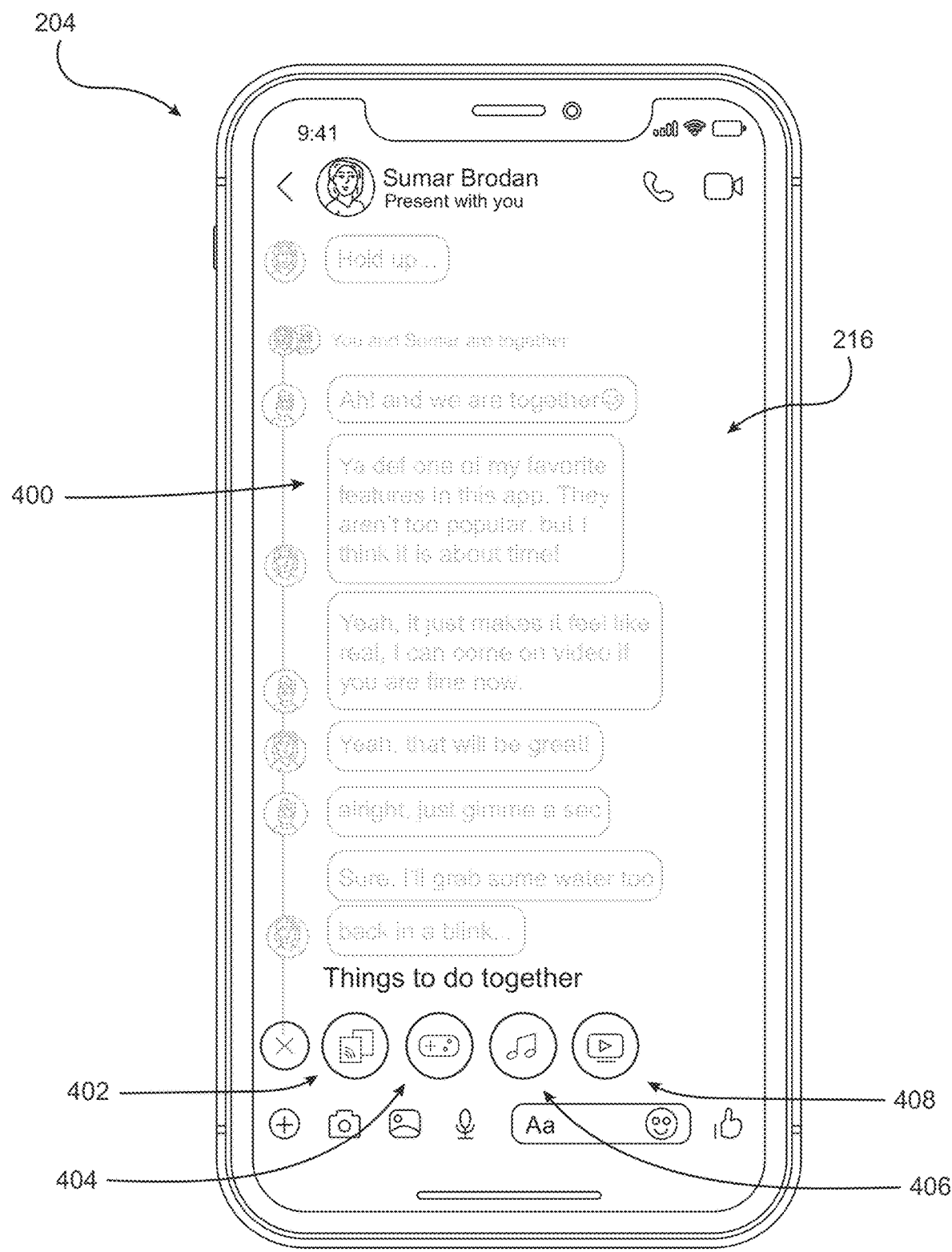
FIG. 4 is an illustration of an exemplary hover screen of group activities accessible via the exemplary digital messaging thread of FIG. 3.

As another example, social networking platform 212 may provide a digital conferencing service (e.g., an audio and/or video conferencing service) via server 202. The digital conferencing service may operate as a stand-alone service and/or may be integrated with another service (e.g., the messaging service, newsfeed service, and/or digital story service described herein). The term "digital conferencing service" generally refers to any type or form of communications framework that enables video conferencing (e.g., via video calling and/or video chatting) and/or audio conferencing between two or more users. In some examples, the digital conferencing service may enable the digital transmission and/or sharing of real-time media streams (e.g., real-time video streams and/or audio streams) from one or multiple endpoints. In examples in which the digital conferencing service is integrated with a digital messaging service, the real-time media streams may be transmitted and shared via a messaging interface (e.g., via a private messaging thread interface such as digital messaging thread 216 as depicted in FIG. 3). The term "real-time media stream" generally refers to any type or form of media (e.g., audio and/or video) that is transmitted in real-time from an endpoint (i.e., transmitting device) to one or more additional endpoints.

In some examples, social networking platform 212 may provide a messaging service. The term "messaging service" may generally refer to any type or form of digital message delivery system that enables users of social networking platform 212 to exchange messages (e.g., text messages, audio messages, and/or video messages) within a digital messaging thread, such as digital messaging thread 216. Digital messaging thread 216 may generally refer to a series of digital messages exchanged by users with access rights (e.g., rights to access and contribute) to digital messaging thread 216 and/or to a data structure for maintaining the series of digital messages. Digital messaging thread 216 may represent and/or be presented within an interface. The digital messages posted to digital messaging thread 216 may include a variety of content (e.g., text, links, live videos, voice recordings, video recordings, etc.). Digital messaging thread 216 may refer to a private messaging thread and/or a public messaging thread. FIG. 3 depicts an exemplary embodiment of digital messaging thread 216 in which digital messaging thread 216 represents a private thread of text-based messages exchanged between a group of users (e.g., between user 206 and contact 210).

In some examples, digital messaging thread 216 may (e.g., in addition to enabling the exchange of posted messages) enable up-leveling to a variety of group activities. For example, digital messaging thread 216 may enable digital conferencing (e.g., audio conferencing and/or video conferencing) between the users of the thread. As another example, digital messaging thread 216 may enable co-watching video content (e.g., a film) and/or co-listening to audio content via digital messaging thread 216 (e.g., within a thread interface presenting digital messaging thread 216 and/or launched from digital messaging thread 216). Additionally or alternatively, digital messaging thread 216 may enable co-playing a video game and/or screen sharing via digital messaging thread 216. In some examples, group activities (and/or a certain set of group activities) may only be enabled when certain conditions are met. For example, group activities (and/or a certain set of group activities) may only be enabled when multiple users are accessing digital messaging thread 216 at the same time, as will be described in greater detail below.

In some examples, the disclosed systems may signal and promote co-present moments to users of digital messaging thread 216. The term "co-present moment" may generally refer to a temporal moment during which two or more users of a digital messaging thread are accessing the thread at the same time. The disclosed systems may signal co-present moments in a variety of ways. In some examples, the disclosed systems may signal a co-present moment by displaying a digital indicator within digital messaging thread 216 proximate co-present messages 220 (i.e., messages posted during a co-present moment) to visually identify messages posted during a co-present moment. The disclosed systems may display any type or form of digital indicator to signal a co-present moment. In some examples, a digital indicator may take the form of a digital streak, such as digital streak indicator 218, displayed proximate (e.g., alongside) co-present messages 220. The term "digital streak indicator" may refer to any type or form of elongate demarcation. Digital streak indicator 218 may take any visual form. In some examples, digital streak indicator 218 may take the form of a line. In these examples, digital streak indicator 218 may include a line of a variety of line-types (e.g., a straight line, an undulated line, a curled line, a solid line, a dotted line, etc.), may be provided with a variety of widths, may include edges and/or corners of a variety of forms (e.g., pointed, curved, wavy, etc.), may be displayed in a variety of colors (e.g., green), etc. FIG. 3 depicts an exemplary embodiment of digital streak indicator 218 according to one embodiment.

Digital streak indicator 218 may be visually associated with co-present messages 220 in a variety of ways. In some examples, digital streak indicator 218 may be configured to extend over a length of digital messaging thread 216 corresponding to co-present messages 220 (e.g., to a portion of digital messaging thread 216 in which co-present messages 220 are posted). In one embodiment, each message posted to a digital messaging thread may be positioned next to a profile element associated with a user who sent the message. In these examples, digital streak indicator 218 may connect the profile images next to each co-present message, chunking the co-present messages together (e.g., as shown in FIG. 3). In some embodiments, digital streak indicator 218 may appear (e.g., may be presented) in real-time, as co-present messages are posted to digital messaging thread 216. In examples in which co-present messages 220 are presented as a vertical series (i.e., enabling vertical scrolling between the messages), digital streak indicator 218 may run vertically alongside the messages.

In some examples (e.g., in addition to or in place of digital streak indicator 218), the disclosed systems may signal a co-present moment with text. For example, the disclosed systems may display text within the body of digital messaging thread 216 (e.g., at the top of digital streak indicator 218). FIG. 3 provides an exemplary example of this in which the text "You and Sumar are together" appears at the top of digital streak indicator 218. As another example, the disclosed systems may display text within a header of digital messaging thread 216 (e.g., beneath a title corresponding to digital messaging thread 216). FIG. 3 provides an exemplary example of this in which the text "Present with You" appears beneath a contact's name. In some examples, the disclosed systems may signal a co-present moment with an icon (e.g., in addition to or in place of digital streak indicator 218). For example, a co-present moment may be signaled with a double-profile icon (e.g., double-profile icon 300 in FIG. 3) in place of a single-user-account profile icon. In some embodiments, the disclosed systems may signal a co-present moment by modifying an overall appearance of digital messaging thread 216 and/or of a header section positioned above digital messaging thread 216 (e.g., by changing a color included in the thread and/or header section, applying a filter over the thread and/or header section, etc.).

In some examples, as briefly mentioned above, the disclosed systems may provide one or more functionalities that enable real-time group interaction in response to detecting a co-present moment (e.g., functionalities that may not be enabled during a non-co-present moment). In one such example, the disclosed systems may provide an element for video calling and/or audio calling (e.g., in response to detecting that two or more users are co-present in digital messaging thread 216), such as video element 302 and/or audio element 304 in FIG. 3. In some examples in which an audio or video call occurs during a co-present moment via digital messaging thread 216, the disclosed systems may enable users to record the call and/or a portion of the call and/or to take a snapshot of the call. In these examples, the disclosed systems may post the recording and/or snapshot to digital messaging thread 216. The recording and/or snapshot may be posted during the co-present moment and/or once the co-present moment has terminated (e.g., as part of a co-present archive process).

In addition, or as an alternative, to providing a video or audio element, the disclosed systems may provide one or more elements for a virtual group activity (e.g., co-watching content, co-listening to music, co-playing a video game, and/or screen sharing) during a co-present moment. As a specific example, selection via user input of a more element 306 in FIG. 3 may launch the display of an overlay screen 400 (depicted in FIG. 4) with a paste element 402 (for displaying content copied to a digital clipboard prior to a selection of paste element 402), a video game element 404, a co-listening element 406, and/or a co-watching element 408.

Figures 5, 6:
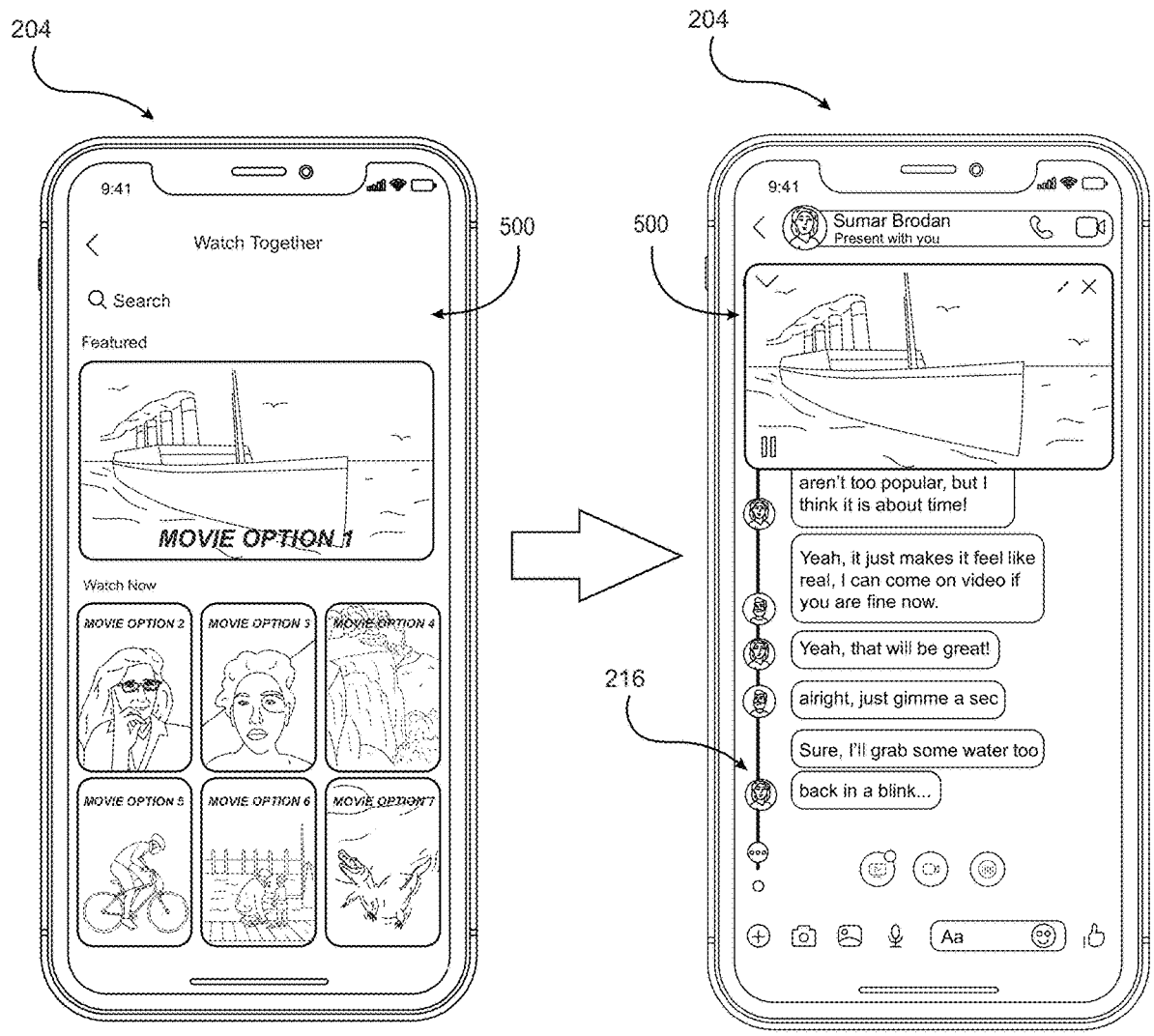
FIG. 5 is an illustration of an exemplary film selection screen for co-watching a film via the exemplary digital messaging thread of FIG. 3.
FIG. 6 is an illustration of the exemplary digital messaging thread of FIG. 3 displaying a film selected via the film selection screen of FIG. 5.

In this specific example, selection of paste element 402 may trigger the disclosed systems to display, via digital messaging thread 216, content copied to a digital clipboard (and/or content accessed via a link copied to the digital clipboard) prior to the selection of paste element 402. Selection of video game element 404 may trigger the disclosed systems to provide a game-selection screen with selectable video game options. Selection of co-listening element 406 may trigger the disclosed systems to provide a music-selection screen with selectable music options. Selection of co-watching element 408 may trigger the disclosed systems to provide a video-selection screen with selectable video options, such as video selection screen 500 depicted in FIG. 5. In response to detecting a user selection of an option from the game-selection screen, music-selection screen, and/or video-selection screen, the disclosed systems may present the selected content via digital messaging thread 216. For example, as shown in FIG. 6, selection of a film from video selection screen 500 may trigger the selected film to be shown in digital messaging thread 216 (e.g., in each instance of digital messaging thread 216 being presented to a user accessing digital messaging thread 216). Additionally or alternatively, a user selection from the game-selection screen, music-selection screen, and/or video-selection screen may trigger the disclosed systems to nudge other users, who are co-present in digital messaging thread 216 and/or who have access rights to digital messaging thread 216, to join in the activity corresponding to the user selection via digital messaging thread 216. In some examples, the disclosed systems may enable users to record and/or take a snapshot of a virtual group activity during a co-present moment. In these examples, the disclosed systems may post the recording and/or snapshot to digital messaging thread 216 (e.g., during the co-present moment and/or once the co-present moment has terminated).

Figure 7:
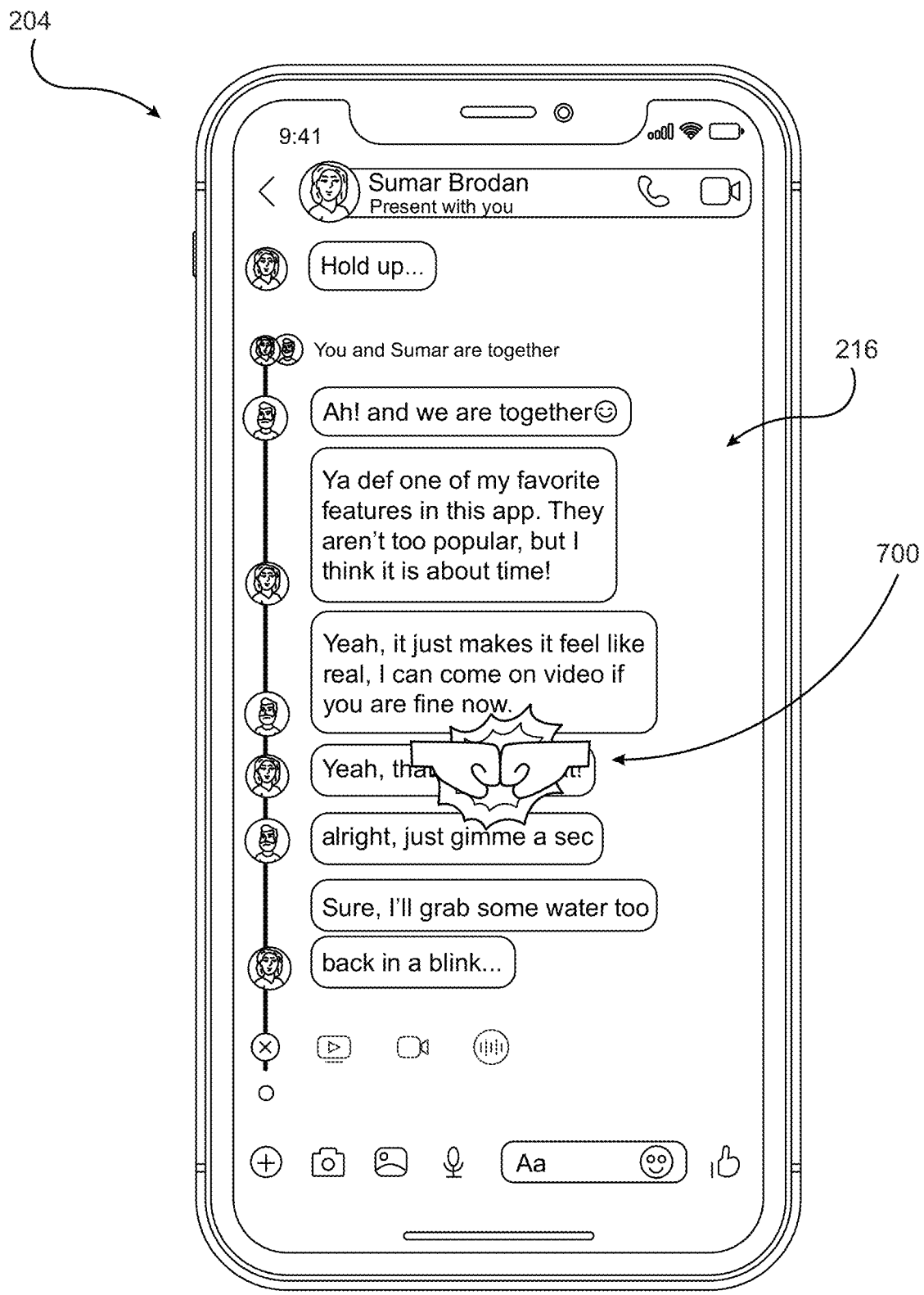
FIG. 7 is an illustration of an exemplary interactive graphic accessible during a co-present moment.

In one embodiment, interactive emojis may become available during a co-present moment. In this embodiment, a first user may select an interactive emoji that will be presented to a second user upon its selection. If the second user then selects the presented emoji, the emoji may respond in some way (e.g., may be modified) on both the first and second users' screens (in response to the second user's selection). Using FIG. 7 as a specific example, contact 210 may have selected a fist-bump emoji from a set of selectable interactive emojis provided during a co-present moment. In response, the disclosed systems may have provided an emoji of a solitary fist within the instance of digital messaging thread 216 provided to user 206. Then, user input (e.g., from user 206) may have been received that selects the provided emoji. In response, the disclosed systems may have provided a graphic 700, within both the instance of digital messaging thread 216 provided to user 206 and the instance of digital messaging thread 216 provided to contact 210, of two fists bumping, as depicted in FIG. 7.

Figures 10A, 10B:
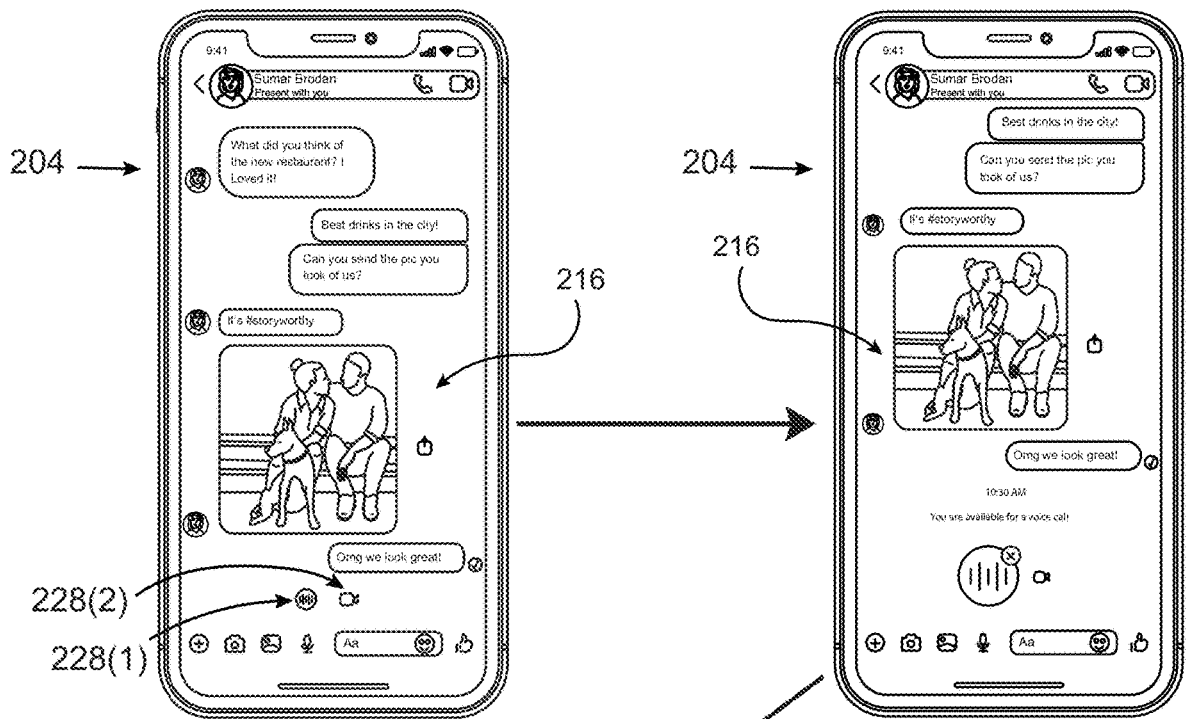
FIGS. 10A-10B are illustrations of a first user's device with an exemplary availability element presented in an instance of an exemplary messaging thread.

In one embodiment, a truncated calling-element may be persistently maintained within digital messaging thread 216 (i.e., during both co-present moments and non-co-present moments). FIG. 8A illustrates an exemplary embodiment of a truncated calling-element 800, during a non-co-present moment, which has a first dot corresponding to audio calling and a second dot corresponding to video calling. The truncated calling-element may expand (e.g., when selected via user input) to reveal an audio-calling element and a video-calling element (as shown in FIG. 10A and as will be described in greater detail below). The truncated and expanded calling-elements may represent traditional calling elements, which send a direct calling request when selected, or may be configured to signal calling availability, as will be discussed in greater detail below in connection with FIGS. 10A-10D.

In some embodiments, a position of the truncated calling-element within digital messaging thread 216 may change during a co-present moment (e.g., in response to the disclosed systems detecting a co-present moment). For example, as shown in FIG. 8B, truncated calling-element 800 may shift a designated distance to the left and/or be positioned over digital streak indicator 218 during a co-present moment. In some examples, truncated calling-element 800 may be configured to stay at a certain position within digital streak indicator 218 during a co-present moment (e.g., a designated distance from a bottom of digital messaging thread 216). In response to detecting that a co-present moment has ended, the truncated calling-element may return to its non-co-present moment position (e.g., in the center of digital messaging thread 216 a predetermined distance from the bottom of digital messaging thread 216).

In some examples, the disclosed systems may present a pause element (i.e., a "be-right-back" element) within digital messaging thread 216 during a co-present moment (e.g., pause element 308 depicted in FIG. 3). The pause element may enable a user to temporarily leave digital messaging thread 216 without ending the co-present streak of messages. Additionally, a termination element (e.g., with an emoji of a hand waving good-bye), such as termination element 310 in FIG. 3, may end a co-present moment (e.g., enabling a user to end a co-present moment without leaving digital messaging thread 216).

When a co-present moment has ended, the disclosed systems may archive the co-present moment within digital messaging thread 216. The co-present moment may be archived in a variety of ways. In some examples, digital streak indicator 218 may end. That is, digital streak indicator 218 may no longer be presented alongside messages that are posted to digital messaging thread 216 after the co-present moment has ended. Additionally, a color of the ended digital streak indicator 218 may change (e.g., from green to gray) to show the ended streak corresponds to an archived co-present moment. Other digital indicators of the co-present moment (e.g., text and/or icons) may be removed from digital messaging thread 216 and/or a position of one or more elements (e.g., such as truncated calling-element 800 in FIGS. 8A-8B) may be changed (e.g., to an original non-co-present moment position).

In examples in which a user recorded and/or took a snapshot of a call and/or other group activity during a co-present moment, the recording and/or snapshot may be included within the corresponding archived streak, serving as an archive of the call and/or other group activity. In some examples, the disclosed systems may provide a play-back element for an archived digital messaging thread, which may be visually associated with an archived co-present moment within the thread. When selected, the play-back element may show a video screen capture of the thread activity during the archived co-present moment. The video screen capture may show an evolution of the archived digital messaging thread during the archived co-present moment (e.g., showing messages post one by one, showing a recording and/or a snapshot of a recording, etc.).

In some examples, the disclosed systems may enable unilateral video calling (e.g., during co-present moments). In such examples, the disclosed systems may enable a user (e.g., user 206) to send a unidirectional live video stream to one or more additional users (e.g., contact 210) via digital messaging thread 216. Enabling a user to send a unidirectional live video stream to another user (as opposed to inviting the other user to join a call) may ease social and/or contextual barriers to initiating video calling via messaging interfaces (i.e., barriers to up-leveling a text-based exchange via a digital messaging thread to a video-based exchange).

The term "live video stream" generally refers to digital video content, originating from a user device, that is transmitted in real-time, as a series of frames, from a transmitting device to one or more endpoints. Frames may be displayed by an endpoint (to a user) as the frames are received (e.g., without waiting for an entire series of frames to be received). A "unidirectional live video stream" (i.e., a one-way live video stream) may refer to a single video stream that originates from a single user device (e.g., being transmitted in one direction only from originating device to endpoint). A "bidirectional video stream" may refer to two or more video streams, each originating from a different user device, that are streamed in a same video streaming session (e.g., at a same time within a same interface and/or a same streaming element). A "bidirectional video conference" may refer to a video streaming session with a bidirectional video stream. Each endpoint that is both (1) sending a live video stream and (2) receiving one or more live video streams may be participating bidirectionally.

In some examples, the disclosed systems may provide, within digital messaging thread 216, a streaming initiation element 222 that initiates unidirectional video streaming. Streaming initiation element 222 may be presented persistently (e.g., in both co-present moments and non-co-present moments) and/or may be presented only during co-present moments (e.g., in response to detecting that user 206 and contact 210 are accessing digital messaging thread 216 at a same time). The selection of streaming initiation element 222 via a user device (e.g., by user 206 via first user device 204) may be configured to trigger unidirectional streaming of only a live video stream originating from the user device (e.g., a live video stream of user 206 originating from first user device 204), without triggering the streaming of any live video stream originating from any other device (e.g., second user device 208) being used to access digital messaging thread 216.

Figures 9A, 9B, 9C:
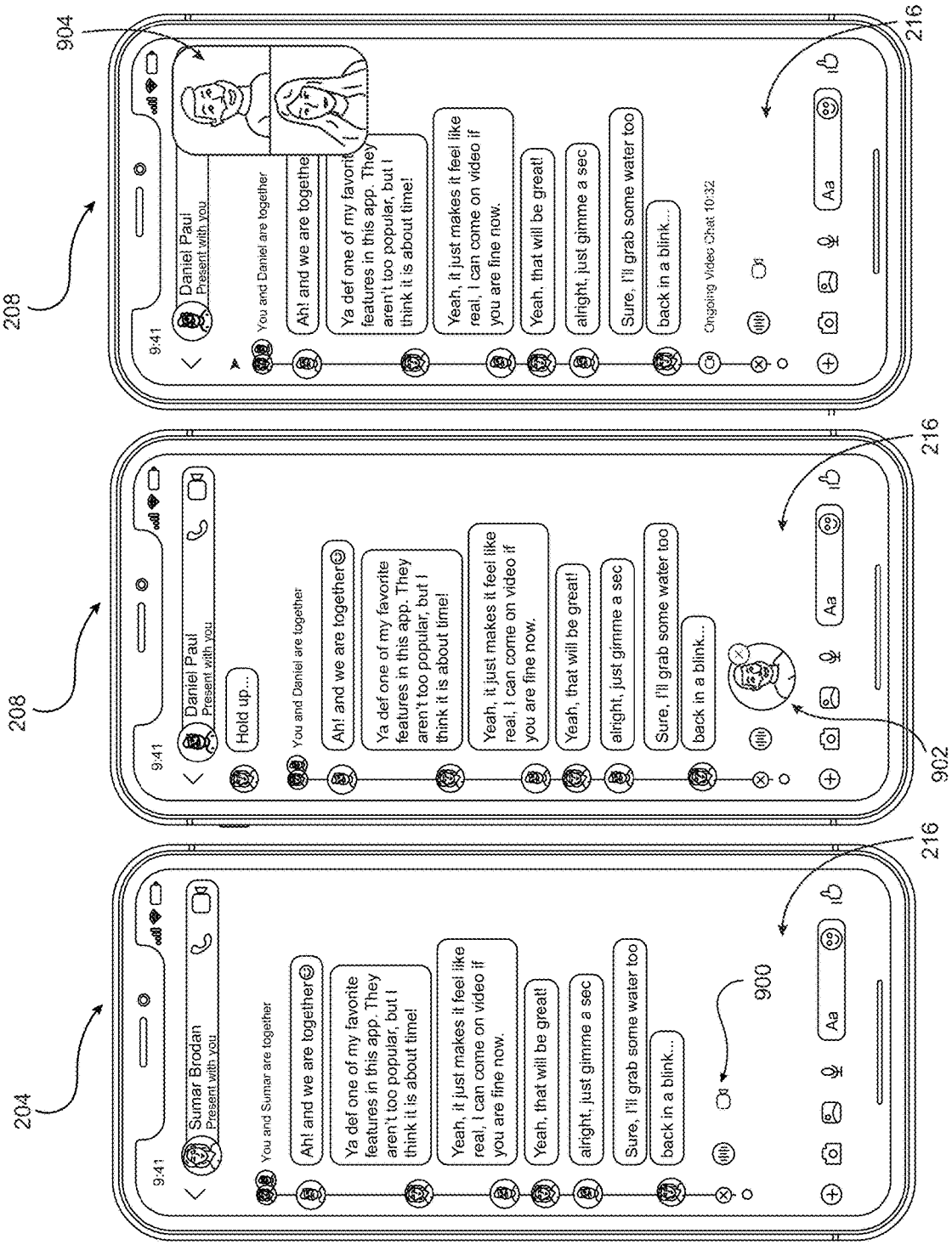
FIG. 9A is an illustration of an exemplary messaging thread interface with an exemplary one-way-video-streaming initiation element.
FIG. 9B is an illustration of an exemplary messaging thread interface with an exemplary one-way-video-streaming element, streaming video of a user.
FIG. 9C is an illustration of the exemplary messaging thread interface of FIG. 9B in response to user input selecting the exemplary one-way-video streaming element.

Streaming initiation element 222 may take a variety of forms (e.g., may have any shape and/or size, may include any color or combination of colors, may include any type or form of graphic, text, and/or image, etc.). In some examples, streaming initiation element 222 may include a graphic of a video camera and/or a unidirectional arrow. FIG. 9A provides an exemplary illustration of a streaming initiation element 900, provided within an instance of digital messaging thread 216 presented via first user device 204, according to one embodiment.

In response to detecting that a user (e.g., user 206) has selected streaming initiation element 222, the disclosed systems may stream a unidirectional live video stream 224, originating from a device of the user (e.g., first user device 204 of user 206), via digital messaging thread 216. Live audio originating from first user device 204 may also be streamed. In some examples, the disclosed systems may stream live video stream 224 via a unidirectional streaming element (e.g., streaming element 226 in FIG. 2) presented within digital messaging thread 216. Streaming element 226 may take a variety of forms (e.g., may have any shape and/or size, may include any color or combination of colors, may include any type or form of graphic, text, and/or image, etc.). FIG. 9B provides an exemplary illustration of a unidirectional streaming element 902, streaming live video of user 206 to contact 210 via an instance of digital messaging thread 216 presented via second user device 208. FIG. 9B depicts an embodiment in which unidirectional streaming element 902 takes the form of a circular element that is maintained at a fixed position within digital messaging thread 216. In some embodiments, as illustrated in FIG. 9B, streaming element 226 (e.g., element 902 in FIG. 9B) may take the place of streaming initiation element 222 (e.g., element 900 in FIG. 9A) once selected by a user, and streaming element 226 may revert to streaming initiation element 222 once the unidirectional video streaming has ended.

As live video stream 224 streams via digital messaging thread 216, the one or more additional users (e.g., contact 210) may continue to reply to user 206 via text (without providing video). If an additional user (e.g., contact 210) eventually selects to provide his or her own live video stream, the disclosed systems may launch a bidirectional video conference (e.g., video call) between the users that includes live video streams originating from both the user's device and the additional user's device (e.g., via a hover screen element such as hover element 904 depicted in FIG. 9C). In some examples, streaming element 226 may represent a selectable element that, in response to being selected by an additional user of digital messaging thread 216, is configured to launch the bidirectional video conference.

In some additional or alternative examples, the disclosed systems may enable unidirectional audio streaming (e.g., in which selection of an audio streaming initiation element triggers only the streaming of a unidirectional live audio stream, originating from a device used to select the streaming initiation element) using the same systems and methods just described in connection with the disclosed unidirectional live video streaming framework. In these examples, a live audio streaming element may be presented in digital messaging interface 216 as the unidirectional live audio stream is streamed via digital messaging thread 216 and user selection, via an additional user device, of the live audio streaming element may trigger a bidirectional audio conference (e.g., with live audio streams originating from both the user device and the additional user device).

In addition to, or in place of, facilitating and promoting co-present moments, the disclosed messaging service may enable (e.g., operate in conjunction with) an availability paradigm. The availability paradigm may enable users to nudge one another to participate in an audio call and/or a video call via a digital messaging thread by digitally announcing their availability (as opposed to directly calling one another). The availability paradigm may ease user anxieties around using a calling functionality within digital messaging threads to directly call one another, as announcing availability to another user may be experienced by users as less assertive, intrusive, and/or presumptive than directly calling the other user from a digital messaging thread.

The disclosed systems may enable an availability paradigm in a variety of ways. In some examples, the disclosed systems may enable users to announce availability-for-a-call by sending one another availability alerts. Using FIG. 2 as a specific example, the disclosed systems may provide a call-availability element 228 within digital messaging thread 216 that enables user 206 to announce user 206's availability (for a call via digital messaging thread 216) to other users of the thread, such as contact 210. Call-availability element 228 may take any visual form (e.g., may have any shape and/or size, may include any color or combination of colors, may include any type or form of graphic, text, and/or image, etc.). In some examples, call-availability element 228 may enable announcing general availability for multiple types of calling (e.g., for both audio and video calling). In other examples, call-availability element 228 may correspond to a particular type of calling. In some such examples, multiple call-availability elements may be presented within digital messaging thread 216. Turning to FIG. 10A as a specific example, a first call-availability element 228(1) may correspond to audio calling and a second call-availability element 228(2) may correspond to video calling. As illustrated in FIG. 10A, first call-availability element 228(1), configured to signal availability for an audio call when selected, may include a graphic of an audio sound wave and second call-availability element 228(2), configured to signal availability for a video call when selected, may include a graphic of a video camera.

Figures 10C, 10D:
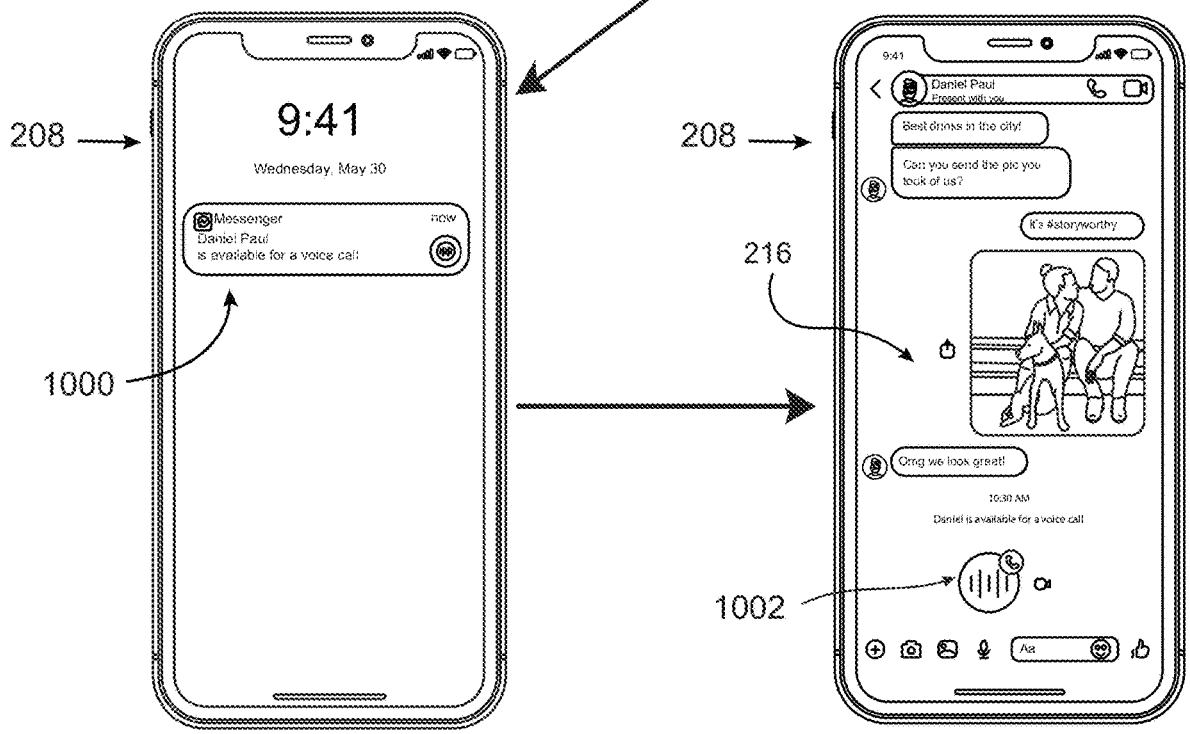
FIG. 10C is an illustration of an exemplary prompt, displayed in a second user's device, indicating availability of the first user associated with FIGS. 10A and 10B.
FIG. 10D is an illustration of a second instance of the exemplary messaging thread depicted in FIGS. 10A-10B, signaling availability of the first user associated with FIGS. 10A and 10B.

In response to user 206 selecting call-availability element 228, the disclosed systems may notify an additional user (e.g., contact 210) participating in digital messaging thread 216 that user 206 is available for a call (e.g., a call via digital messaging thread 216). The disclosed systems may notify the additional user that user 206 is available for a call in a variety of ways. In some examples, the disclosed systems may present a selectable prompt 229, via a display element of the additional user's device, with an availability notification indicating that user 206 is available for a call via digital messaging thread 216. In one example, selectable prompt 229 may represent a push notification. The term "push notification" generally refers to any type of form of digital message (e.g., a pop-up message) that is presented within a display element of a user device. The push notification may take a variety of forms (e.g., the form of a text message and/or a mobile alert). FIG. 10C provides an exemplary illustration of a push notification 1000 that includes the text "Daniel Paul is available for a voice call." In examples in which call-availability element 228 corresponds to a specific type of call, selectable prompt 229 may notify the additional user that user 206 is available for the specific type of call. Using FIGS. 10A and 10C as a specific example, the disclosed systems may indicate that user 206 is available for a "voice call" (as depicted in push notification 1000 in FIG. 10C) in response to detecting user input, received via first user device 204, selecting first call-availability element 228(1) presented in FIG. 10A.

In some examples, a visual configuration of call-availability element 228 may change in an instance of digital messaging thread 216 utilized by user 206 in response to user 206's selection of call-availability element 228 to confirm the selection to user 206. The visual configuration may change in any manner that signals that call-availability element 228 has been selected. Using FIG. 10B as a specific example, in response to user 206 selecting first call-availability element 228(1) via a first instance of digital messaging thread 216 presented via first user device 204, the visual configuration of first call-availability element 228(1) may enlarge within the first instance of digital messaging thread 216, text may be added proximate first call-availability element 228(1) within the first instance of digital messaging thread 216, and/or an additional graphic (e.g., a selectable exit graphic that enables user 206 to cancel his or her availability signal when selected) may be added proximate first call-availability element 228(1) within the first instance of digital messaging thread 216.

In examples in which a selectable prompt 229 is sent to the additional user (e.g., contact 210), the disclosed systems may detect that the additional user has selected selectable prompt 229. In response to this detection, the disclosed systems may present, to the additional user (e.g., via the additional user's device), a second instance of digital messaging thread 216 with an indicator that user 206 is available for a call and/or a call-launch element 231 (e.g., depicted exemplarily as call-launch element 10002 in FIG. 10D). Call-launch element 231 may, when selected, launch the call, for which user 206 signaled user 206 was available, via digital messaging thread 216. In certain embodiments (e.g., embodiments in which the additional user is already accessing the second instance of digital messaging thread 216 at the time user 206 selects call-availability element 228), call-launch element 231 may be presented in response to user 206's selection (e.g., without the additional user selecting availability notification 229).

In some examples, the disclosed availability paradigm may include enabling a user (e.g., user 206) to narrowcast a call-availability status to a choice group of the user's contacts in addition to broadcasting a messaging-availability status (i.e., a generic availability status) to contacts not in the choice group. In these examples, the disclosed systems and methods may simultaneously (1) narrowcast the call-availability status to contacts of the user within the choice group and (2) broadcast the messaging-availability status to contacts of the user who are not within the choice group. The narrowcasted call-availability status may indicate a variety of calling availabilities (e.g., available-for-audio-calling, available-for-video-calling, not-available-for-a-call, and/or an incognito status in which a user is online but indicated as not being so). The broadcasted messaging-availability status may be configured to signal whether or not a user is available for a live (e.g., text-based) message exchange (e.g., to digitally chat via a messaging thread). In some examples, the broadcasted messaging-availability status may be binary (e.g., available for messaging or unavailable for messaging). In one embodiment, the broadcasted messaging-availability status may also include an away status (e.g., in which the user is logged in to the messaging service but has not accessed an interface of the messaging service in a designated amount of time).

The disclosed systems may narrowcast a user's call-availability status, to a contact within the user's choice group of contacts, in a variety of ways. In one example, the disclosed systems may display a call-availability graphic, associated with the user's call-availability status, proximate a designator for the user within a messaging interface generated for the contact. For example, such a call-availability graphic may be displayed within a contact list interface—next to an entry for the user—and/or next to the user's name in a messaging thread interface generated for the contact. The call-availability graphic may take any visual form. In some examples in which the call-availability graphic signals that the user is available for a particular type of call, the call-availability graphic may include a representation of the type of call. For example, the call-availability graphic for an available-for-video-calling status may take the form of a camera. As another example, the call-availability graphic for an available-for-audio-calling status may take the form of a sound wave. An unavailable-for-calling status and/or an incognito status may be signaled with the absence of a call-availability graphic (e.g., by not displaying a call-availability graphic proximate a designator for the user and/or by displaying only a generic messaging-availability status indicator).

Figure 11:
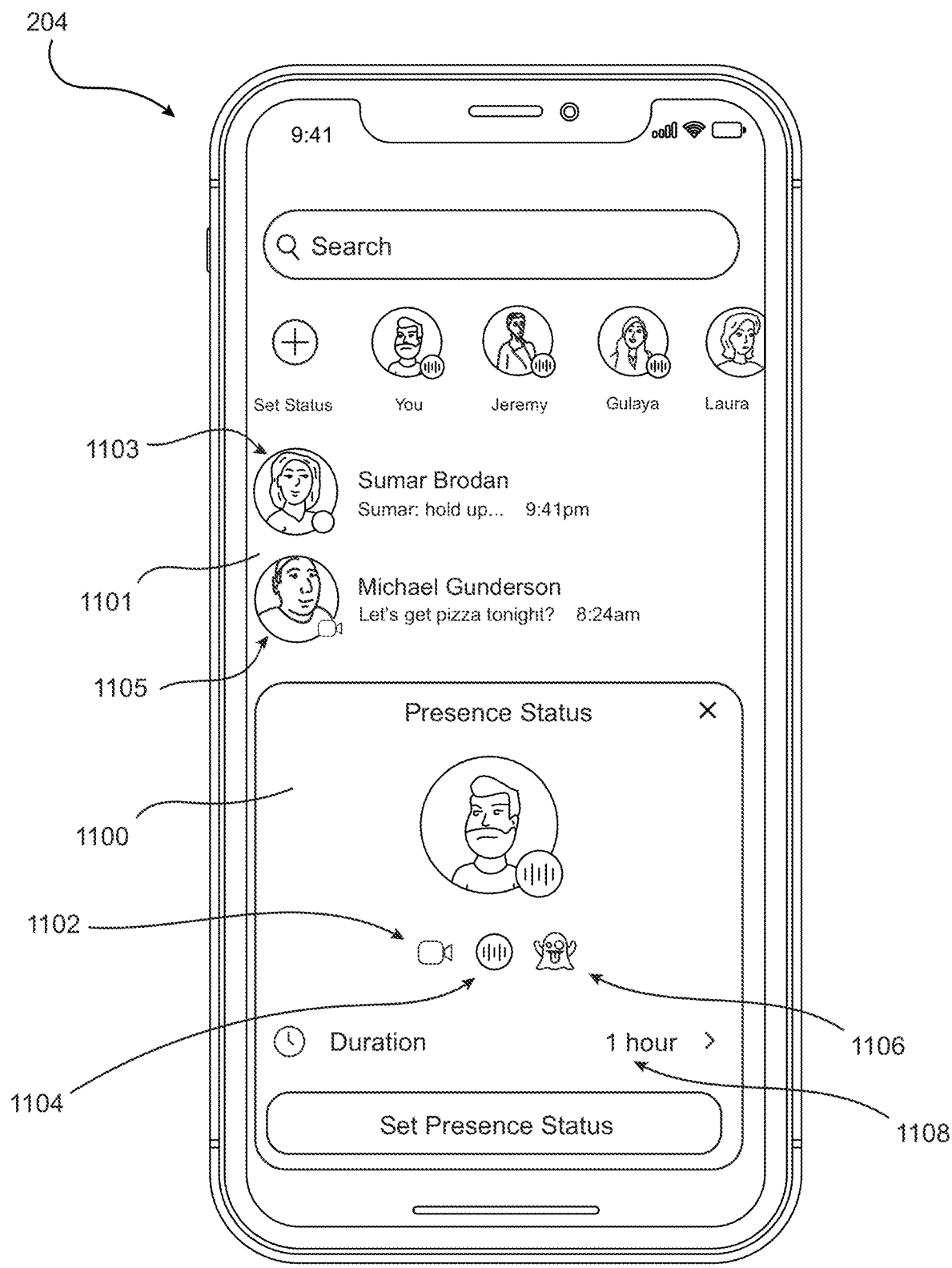
FIG. 11 is an illustration of an exemplary call-status selection interface.

The disclosed systems may also broadcast a user's messaging-availability status (e.g., to a contact of the user who is not in the choice group of contacts) in a variety of ways. For example, the disclosed system may display a messaging-availability graphic, associated with the user's messaging-availability status, proximate a designator for the user within a messaging interface generated for the contact (e.g., within a contact list interface and/or a messaging thread interface generated for the contact). The messaging-availability graphic may also take a variety of forms. In one example, a green dot graphic may signal an available-for-messaging status and the absence of the green dot graphic may signal an unavailable-for-messaging status and/or an incognito status. Additionally, a yellow dot graphic may signal an away status. FIG. 11 provides an exemplary illustration of a contact list 1101 in which a first entry 1103 for a contact is proximate a messaging-availability graphic and a second entry 1105 for another contact is proximate a call-availability graphic.

The disclosed systems may determine (1) a user's availability status (e.g., the user's call-availability status and/or messaging-availability status) and (2) which of the user's contacts to include in the choice group of contacts in a variety of ways. In some examples, an availability status and/or the choice group of contacts may be automatically detected. For example, an availability status may be determined based on the user's behavior (e.g., whether the user is logged into the messaging service, is accessing a messaging interface of the service, and/or has accessed a messaging interface of the service within a designated amount of time). As another example, the choice group of users may be detected based on one or more user-closeness metrics (e.g., a relationship indicated in the user's profile, a metric of digital user engagement with a contact, etc.).

Additionally or alternatively, the disclosed systems may determine a user's availability status and/or the user's choice group of contacts based on user input. For example, the disclosed systems may provide a user with (1) a choice group selection interface, which enables the user to select users to be included within the user's choice group of users, (2) a narrowcasting status selection interface, in which the user may select from a group of call-availability statuses, and/or (3) a broadcasting status selection interface, in which the user may select an active or inactive messaging status. Then, the disclosed systems may detect (1) a selection of users, to be included within the choice group, via the choice group selection interface and/or (2) a selection of a call-availability status via the narrowcasting status selection interface and/or a broadcasting status via the broadcasting status selection interface. Based on the user selections, the disclosed systems may signal (1) the selected call-availability status to the users selected to be included within the choice group, but (2) a generic availability status (e.g., selected via the broadcasting status selection interface) to users that were not selected to be included within the choice group.

A status selection interface may be presented in a variety of configurations. FIG. 11 depicts an exemplary calling-status selection interface 1100 (presented as a hover screen over a contact list) that may enable a user to select a calling status to be narrowcasted to contacts in the user's choice group of contacts. Calling-status selection interface 1100 includes three status options: (1) an available-for-video-calling status selection element 1102, (2) an available-for-audio-calling status selection element 1104, and (3) an incognito status selection element 1106 (depicted by a graphic of a ghost). Additionally, calling-status selection interface 1100 includes a status-duration element 1108 that may enable the user to narrowcast a selected call-availability status for a determined length of time, after which the selected call-availability status may expire (e.g., the disclosed systems may cease narrowcasting the call-availability status once the determined length of time has expired and may instead broadcast the generic messaging status to the contacts within the choice group of contacts).

In addition (or instead of) ceasing to narrowcast a call-availability status based on an expiration of the status, in some examples, the disclosed systems may change a call-availability status based on a detected digital user behavior. For example, after narrowcasting a call-availability status for user 206, the disclosed systems may determine that user 206 has joined a new call via the messaging service. In response, the disclosed systems may cease to narrowcast the call-availability status to user 206's choice group of contacts and may, instead, (1) broadcast user 206's messaging-availability status to user 206's choice group of contacts and/or (2) broadcast an unavailable status (e.g., to user 206's choice group of contacts and/or to all contacts of user 206).

Returning to FIG. 1, at step 110, one or more of the systems described herein may detect that a user of a messaging service has digitally selected a video-streaming initiation element presented within a messaging thread interface that enables digital messaging between the user and a contact of the user. For example, as illustrated in FIG. 2, a messaging module 230 may detect that user 206 has digitally selected streaming initiation element 222 presented within digital messaging thread 216, which enables digital messaging between user 206 and contact 210. Turning to FIG. 9A as a specific example, messaging module 230 may detect that user 206 has selected streaming initiation element 900, via an instance of digital messaging thread 216 presented via a display element of first user device 204.

Digital messaging thread 216 and streaming initiation element 222 may include a variety of features, as described above in connection with FIG. 2. Messaging module 230 may detect user 206's selection of streaming initiation element 222 in a variety of ways. For example, in examples in which messaging module 230 operates as part of server 202, messaging module 230 may detect user 206's selection by receiving an indication of user 206's selection from first user device 204. Additionally or alternatively, in examples in which messaging module 230 operates as part of a user device (e.g., first user device 204), messaging module 230 may detect user 206's selection directly via user input to the user device and/or an auxiliary device of the user device (via clicking input, tapping input, etc.).

At step 120, one or more of the systems described herein may, in response to detecting that the user has digitally selected the video-streaming initiation element, trigger the streaming of a unidirectional live video stream originating from a device of the user only, without triggering the streaming of any live video stream originating from a device of the contact (e.g., in place of triggering a bidirectional video conference with live video streams originating from both the user's device and a device of the contact). For example, as illustrated in FIG. 2, messaging module 230 may trigger the streaming of live video stream 224 (e.g., of user 206), originating from first user device 204, without triggering the streaming of any video stream (e.g., of contact 210) originating from second user device 208.

Messaging module 230 may stream live video stream 224 in a variety of ways. In examples in which messaging module 230 operates as part of server 202, messaging module 230 may stream live video stream 224 by receiving live video stream 224 from first user device 204 and transmitting live video stream 224 to second user device 208 in real-time and/or by instructing first user device 205 and/or second user device 208 to present live video stream 224 in real-time. In examples in which messaging module 230 operates as part of first user device 204 and/or second user device 208, messaging module 230 may stream live video stream 224 by presenting live video stream 224 via first user device 204 and/or second user device 208 (e.g., presenting each frame in real-time as the frame is received). In examples in which messaging module 230 operates as part of first user device 204, messaging module 230 may capture the frames of live video stream 224 via a camera element of first user device 204 and transmit the frames (e.g., to server 202 and/or second user device 208) in real-time.

Messaging module 230 may stream live video stream 224 via a variety of elements presented within digital messaging thread 216, such as streaming element 226, as described previously in connection with FIG. 2. In some examples, streaming element 226 may represent a selectable element and messaging module 230 may detect that contact 210 has digitally selected streaming element 226 (e.g., via user input to second user device 208). In these examples, this detection may trigger messaging module 230 to launch a bidirectional video conference (e.g., a video call) via digital messaging thread 216 between user 206 and contact 210 by streaming (1) a live video stream originating from first user device 204 and (2) a live video stream originating from second user device 208. In one embodiment, messaging module 230 may launch the bidirectional video conference by ceasing to stream unidirectional live video stream 224 within streaming element 226 and, instead, streaming the live video streams (originating from first user device 204 and second user device 208) within (i) one or more hover elements presented over digital messaging thread 216 and/or (ii) a split-screen configuration of digital messaging thread 216 that includes a messaging thread in a first portion and video conferencing elements (e.g., with the live video streams) in a second portion. Using FIGS. 9B-9C as a specific example, messaging module 230 may detect that contact 210 has selected unidirectional streaming element 902 depicted in FIG. 9B. In response, messaging module 230 may (1) cease streaming live video via unidirectional streaming element 902 and (2) begin streaming a first live video stream from first user device 204 and a second live video stream from second user device 208 via hover element 904 depicted in FIG. 9C.

In examples in which more than two users are accessing digital messaging thread 216 at a time at which contact 210 digitally selects streaming element 226, contact 210's selection of streaming element 226 may only trigger the streaming of live video streams originating from first user device 204 and second user device 208, and these live video streams may be displayed via each device being used to access digital messaging thread 216 (e.g., to each user accessing digital messaging thread 216). Additionally, in some examples, the selection may trigger a prompt to be displayed to other users inviting the other users to join the bidirectional video conference by contributing a live video stream. Alternatively, in some such examples, contact 210's selection of streaming element 226 may trigger the streaming of live video streams from each user device being used to access digital messaging thread 216.

In addition to enabling unidirectional video calling via messaging interfaces (e.g., as described in connection with the steps of FIG. 1), messaging module 230 may provide and/or enable a variety of additional digital messaging functionalities, such as the features (e.g., the narrowcasting features and co-present moment signaling) described above in connection with FIG. 2. Messaging module 230 may provide each of the functionalities described herein in a variety of ways (e.g., depending on whether messaging module 230 operates as part of server 202 and/or a user device). For example, in examples in which a functionality involves receiving a user selection via user input, messaging module 230 may (1) receive the user input directly (e.g., via clicking input, tapping input, etc.), in embodiments in which messaging module 22 operates within a user device, and/or (2) receive the user input by receiving an indication of the user input from the user device, in embodiments in which messaging module 230 operates within server 202. As another example, in examples in which a functionality involves displaying content to a user, messaging module 230 may (1) display the content to the user directly by displaying the content via a display element of a user device, in embodiments in which messaging module 230 operates within the user device, and/or (2) display the content by instructing the user device to display the content and/or by transmitting the content to the user device for display, in embodiments in which messaging module 230 operates within server 202.

EXAMPLE EMBODIMENTS

Example 1

A computer-implemented method may include (1) detecting that a user of a messaging service has digitally selected a video-streaming initiation element presented within a messaging thread interface that enables digital messaging between the user and a contact of the user and, in response to detecting that the user has digitally selected the video-streaming initiation element, (2) triggering the streaming of a unidirectional live video stream originating from a device of the user only, without triggering the streaming of any live video stream originating from a device of the contact.

Example 2

The computer-implemented method of example 1, where the computer-implemented method further includes, while streaming the unidirectional live video stream originating from the user's device, transmitting a digital text-based message, originating from the device of the user's contact, via the messaging thread interface.

Example 3

The computer-implemented method of examples 1-2, where streaming the unidirectional live video stream originating from the user's device includes streaming the unidirectional live video stream originating from the user's device within a selectable streaming element presented within the messaging thread interface.

Example 4

The computer-implemented method of example 3, where the computer-implemented method further includes (1) detecting that the user's contact has digitally selected the selectable streaming element and (2) in response to detecting that the user's contact has digitally selected the selectable streaming element, launching a bidirectional video conference via the messaging thread interface, between the user and the user's contact, by streaming (i) a live video stream originating from the user's device and (ii) a live video stream originating from the device of the user's contact.

Example 5

The computer-implemented method of example 4, where launching the bidirectional video conference includes (1) ceasing to stream the unidirectional live video stream originating from the user's device within the selectable streaming element and (2) streaming the live video stream originating from the user's device and the live video stream originating from the device of the user's contact within (i) one or more hover elements presented over the messaging thread interface and/or (ii) a split-screen configuration of the messaging thread interface with a messaging thread of the messaging thread interface in a first portion of the messaging thread interface and video conferencing elements, which include the live video stream originating from the user's device and the live video stream originating from the device of the user's contact, in a second portion of the messaging thread interface.

Example 6

The computer-implemented method of examples 3-5, where the selectable streaming element is and/or includes a circular element displayed at a fixed position within the messaging thread interface.

Example 7

The computer-implemented method of examples 1-6, where the computer-implemented method further includes presenting the video-streaming initiation element within the messaging thread interface in response to determining that the user and the user's contact are accessing the messaging thread interface at the same time.

Example 8

The computer-implemented method of examples 1-7, where the digital messaging enabled via the messaging thread interface is enabled via a text-based messaging thread presented in the messaging thread interface.

Example 9

A system for implementing the above-described method may include at least one physical processor and physical memory that includes computer-executable instructions that, when executed by the physical processor, cause the physical processor to (1) detect that a user of a messaging service has digitally selected a video-streaming initiation element presented within a messaging thread interface that enables digital messaging between the user and a contact of the user and, in response to detecting that the user has digitally selected the video-streaming initiation element, (2) trigger the streaming of a unidirectional live video stream originating from a device of the user only, without triggering the streaming of any live video stream originating from a device of the contact.

Example 10

The system of example 9, where the computer-executable instructions further cause the physical processor to, while streaming the unidirectional live video stream originating from the user's device, transmit a digital text-based message, originating from the device of the user's contact, via the messaging thread interface.

Example 11

The system of examples 9-10, where streaming the unidirectional live video stream originating from the user's device includes streaming the unidirectional live video stream originating from the user's device within a selectable streaming element presented within the messaging thread interface.

Example 12

The system of example 11, where the computer-executable instructions further cause the physical processor to (1) detect that the user's contact has digitally selected the selectable streaming element and (2) in response to detecting that the user's contact has digitally selected the selectable streaming element, launch a bidirectional video conference via the messaging thread interface, between the user and the user's contact, by streaming (1) a live video stream originating from the user's device and (2) a live video stream originating from the device of the user's contact.

Example 13

The system of example 12, where launching the bidirectional video conference includes (1) ceasing to stream the unidirectional live video stream originating from the user's device within the selectable streaming element and (2) streaming the live video stream originating from the user's device and the live video stream originating from the device of the user's contact within (i) one or more hover elements presented over the messaging thread interface and/or (ii) a split-screen configuration of the messaging thread interface with a messaging thread of the messaging thread interface in a first portion of the messaging thread interface and video conferencing elements, which include the live video stream originating from the user's device and the live video stream originating from the device of the user's contact, in a second portion of the messaging thread interface.

Example 14

The system of example 11-13, where the selectable streaming element is and/or includes a circular element displayed at a fixed position within the messaging thread interface.

Example 15

The system of examples 9-14, where the computer-executable instructions further cause the physical processor to present the video-streaming initiation element within the messaging thread interface in response to determining that the user and the user's contact are accessing the messaging thread interface at the same time.

Example 16

The system of examples 9-15, where the digital messaging enabled via the messaging thread interface is enabled via a text-based messaging thread presented in the messaging thread interface.

Example 17

A non-transitory computer-readable medium may include one or more computer-readable instructions that, when executed by at least one processor of a computing device, cause the computing device to (1) detect that a user of a messaging service has digitally selected a video-streaming initiation element presented within a messaging thread interface that enables digital messaging between the user and a contact of the user and, in response to detecting that the user has digitally selected the video-streaming initiation element, (2) trigger the streaming of a unidirectional live video stream originating from a device of the user only, without triggering the streaming of any live video stream originating from a device of the contact.

Example 18

The non-transitory computer-readable medium of example 17, where streaming the unidirectional live video stream originating from the user's device includes streaming the unidirectional live video stream originating from the user's device within a selectable streaming element presented within the messaging thread interface.

Example 19

The non-transitory computer-readable medium of example 18, where the computer-readable instructions further cause the computing device to (1) detect that the user's contact has digitally selected the selectable streaming element and (2) in response to detecting that the user's contact has digitally selected the selectable streaming element, launch a bidirectional video conference via the messaging thread interface, between the user and the user's contact, by streaming (1) a live video stream originating from the user's device and (2) a live video stream originating from the device of the user's contact.

Example 20

The non-transitory computer-readable medium of examples 18-19, where the selectable streaming element is and/or includes a circular element displayed at a fixed position within the messaging thread interface.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory device 232, 234, and 236 in FIG. 2) and at least one physical processor (e.g., physical processor 236, 238, and 240 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   detecting, within a messaging thread interface that enables digital messaging between a user of a messaging service and a contact of the user, a co-present moment in which the user and the contact of the user are accessing the messaging thread interface at the same time;

in response to detecting the co-present moment:
providing a video-streaming initiation element within the messaging thread interface;
detecting that the user has digitally selected the video-streaming initiation element and, in response to the user digitally selecting the video-streaming initiation element, triggering the streaming of a unidirectional live video stream originating from a device of the user only, without triggering the streaming of any live video stream originating from a device of the contact; and
initiating a video screen capture of an evolution of the messaging thread interface during the co-present moment, the video screen capture comprising a capture of the unidirectional live video stream;
determining that the co-present moment has ended; and
in response to determining that the co-present moment has ended, providing a play-back element configured to show the video screen capture when selected via user input.

2. The computer-implemented method of claim 1, further comprising, while streaming the unidirectional live video stream originating from the user's device, transmitting a digital text-based message, originating from the device of the user's contact, via the messaging thread interface.

3. The computer-implemented method of claim 1, wherein streaming the unidirectional live video stream originating from the user's device comprises streaming the unidirectional live video stream originating from the user's device within a selectable streaming element presented within the messaging thread interface.

4. The computer-implemented method of claim 3, further comprising:
detecting that the user's contact has digitally selected the selectable streaming element; and
in response to detecting that the user's contact has digitally selected the selectable streaming element, launching a bidirectional video conference via the messaging thread interface, between the user and the user's contact, by streaming (1) a live video stream originating from the user's device and (2) a live video stream originating from the device of the user's contact.

5. The computer-implemented method of claim 4, wherein launching the bidirectional video conference comprises:
ceasing to stream the unidirectional live video stream originating from the user's device within the selectable streaming element; and
streaming the live video stream originating from the user's device and the live video stream originating from the device of the user's contact within at least one of (1) one or more hover elements presented over the messaging thread interface or (2) a split-screen configuration of the messaging thread interface comprising a messaging thread of the messaging thread interface in a first portion of the messaging thread interface and video conferencing elements, comprising the live video stream originating from the user's device and the live video stream originating from the device of the user's contact, in a second portion of the messaging thread interface.

6. The computer-implemented method of claim 3, wherein the selectable streaming element comprises a circular element.

7. The computer-implemented method of claim 1, wherein the video screen capture further comprises a display of each message posted during the co-present moment, shown one by one.

8. The computer-implemented method of claim 1, wherein the digital messaging enabled via the messaging thread interface is enabled via a text-based messaging thread presented in the messaging thread interface.

9. A system comprising:
at least one physical processor;
physical memory comprising computer-executable instructions that, when executed by the physical processor, cause the physical processor to:
detect, within a messaging thread interface that enables digital messaging between a user of a messaging service and a contact of the user, a co-present moment in which the user and the contact of the user are accessing the messaging thread interface at the same time;
in response to detecting the co-present moment:
provide a video-streaming initiation element within the messaging thread interface;
detect that the user has digitally selected the video-streaming initiation element and, in response, trigger the streaming of a unidirectional live video stream originating from a device of the user only, without triggering the streaming of any live video stream originating from a device of the contact; and
initiate a video screen capture of an evolution of the messaging thread interface during the co-present moment, the video screen capture comprising a capture of the unidirectional live video stream;
determine that the co-present moment has ended; and
in response to determining that the co-present moment has ended, provide a play-back element configured to show the video screen capture when selected via user input.

10. The system of claim 9, wherein the computer-executable instructions further cause the physical processor to, while streaming the unidirectional live video stream originating from the user's device, transmit a digital text-based message, originating from the device of the user's contact, via the messaging thread interface.

11. The system of claim 9, wherein streaming the unidirectional live video stream originating from the user's device comprises streaming the unidirectional live video stream originating from the user's device within a selectable streaming element presented within the messaging thread interface.

12. The system of claim 11, wherein the computer-executable instructions further cause the physical processor to:
detect that the user's contact has digitally selected the selectable streaming element; and
in response to detecting that the user's contact has digitally selected the selectable streaming element, launch a bidirectional video conference via the messaging thread interface, between the user and the user's contact, by streaming (1) a live video stream originating from the user's device and (2) a live video stream originating from the device of the user's contact.

13. The system of claim 12, wherein launching the bidirectional video conference comprises:

ceasing to stream the unidirectional live video stream originating from the user's device within the selectable streaming element; and streaming the live video stream originating from the user's device and the live video stream originating from the device of the user's contact within at least one of (1) one or more hover elements presented over the messaging thread interface or (2) a split-screen configuration of the messaging thread interface comprising a messaging thread of the messaging thread interface in a first portion of the messaging thread interface and video conferencing elements, comprising the live video stream originating from the user's device and the live video stream originating from the device of the user's contact, in a second portion of the messaging thread interface.

14. The system of claim 11, wherein the selectable streaming element comprises a circular element.

15. The system of claim 9, wherein the video screen capture further comprises a display of each message posted during the co-present moment, shown one by one.

16. The system of claim 9, wherein the digital messaging enabled via the messaging thread interface is enabled via a text-based messaging thread presented in the messaging thread interface.

17. A non-transitory computer-readable medium comprising one or more computer-readable instructions that, when executed by at least one processor of a computing device, cause the computing device to:

detect, within a messaging thread interface that enables digital messaging between a user of a messaging service and a contact of the user, a co-present moment in which the user and the contact of the user are accessing the messaging thread interface at the same time;

in response to detecting the co-present moment:
provide a video-streaming initiation element within the messaging thread interface;

detect that the user has digitally selected the video-streaming initiation element and, in response, trigger the streaming of a unidirectional live video stream originating from a device of the user only, without triggering the streaming of any live video stream originating from a device of the contact; and initiate a video screen capture of an evolution of the messaging thread interface during the co-present moment, the video screen capture comprising a capture of the unidirectional live video stream;

determine that the co-present moment has ended; and in response to determining that the co-present moment has ended, provide a play-back element configured to show the video screen capture when selected via user input.

18. The non-transitory computer-readable medium of claim 17, wherein streaming the unidirectional live video stream originating from the user's device comprises streaming the unidirectional live video stream originating from the user's device within a selectable streaming element presented within the messaging thread interface.

19. The non-transitory computer-readable medium of claim 18, wherein the computer-readable instructions further cause the computing device to:

detect that the user's contact has digitally selected the selectable streaming element; and in response to detecting that the user's contact has digitally selected the selectable streaming element, launch a bidirectional video conference via the messaging thread interface, between the user and the user's contact, by streaming (1) a live video stream originating from the user's device and (2) a live video stream originating from the device of the user's contact.

20. The non-transitory computer-readable medium of claim 18, wherein the selectable streaming element comprises a circular element.

* * * * *